US009988528B2

(12) United States Patent
Fouquay et al.

(10) Patent No.: US 9,988,528 B2
(45) Date of Patent: Jun. 5, 2018

(54) HMPSA FOR REMOVABLE SELF-ADHESIVE LABEL

(75) Inventors: Stéphane André Fouquay, Mont Saint Aignan (FR); David Goubard, Compiegne (FR)

(73) Assignee: BOSTIK, S.A., Paris (FR)

( * ) Notice: Subject to any disclaimer, the term of this patent is extended or adjusted under 35 U.S.C. 154(b) by 390 days.

(21) Appl. No.: 12/667,200

(22) PCT Filed: Jun. 26, 2008

(86) PCT No.: PCT/FR2008/000901
§ 371 (c)(1),
(2), (4) Date: Mar. 4, 2010

(87) PCT Pub. No.: WO2009/016285
PCT Pub. Date: Feb. 5, 2009

(65) Prior Publication Data
US 2010/0193127 A1 Aug. 5, 2010

(30) Foreign Application Priority Data
Jun. 29, 2007 (FR) .................................... 07 04678

(51) Int. Cl.
| C08L 53/02 | (2006.01) |
| B32B 7/12 | (2006.01) |
| C09J 153/02 | (2006.01) |
| B32B 27/32 | (2006.01) |
| B32B 27/36 | (2006.01) |
| B32B 29/02 | (2006.01) |
| C08K 5/3492 | (2006.01) |

(52) U.S. Cl.
CPC ............... *C08L 53/02* (2013.01); *B32B 7/12* (2013.01); *B32B 27/32* (2013.01); *B32B 27/36* (2013.01); *B32B 29/02* (2013.01); *C08L 53/025* (2013.01); *C09J 153/02* (2013.01); *C09J 153/025* (2013.01); *B32B 2307/75* (2013.01); *B32B 2519/00* (2013.01); *C08K 5/34924* (2013.01); *C09J 2453/00* (2013.01); *Y10T 156/1111* (2015.01); *Y10T 428/1321* (2015.01); *Y10T 428/1352* (2015.01); *Y10T 428/2826* (2015.01)

(58) Field of Classification Search
CPC .. C09J 153/00–153/025; C09J 2453/00; C08L 53/00–53/025
See application file for complete search history.

(56) References Cited

U.S. PATENT DOCUMENTS

| 3,869,416 A | * | 3/1975 | Hoh ....................... C09J 191/06 428/513 |
| 3,950,291 A |   | 4/1976 | Jurrens |
| 5,096,767 A | * | 3/1992 | Harada et al. ................. 428/204 |
| 5,182,323 A |   | 1/1993 | Russell |
| 5,385,965 A |   | 1/1995 | Bernard et al. |
| 6,191,189 B1 |  | 2/2001 | Cinelli et al. |
| 6,517,664 B1 | * | 2/2003 | Dronzek, Jr. ................. 156/328 |
| 6,890,982 B2 | * | 5/2005 | Borsinger .......... C09J 123/0853 524/272 |
| 7,166,341 B2 | * | 1/2007 | Heemann et al. ........... 428/34.1 |
| 7,210,339 B2 | * | 5/2007 | Lewtas et al. .................. 73/105 |
| 2003/0055179 A1 | * | 3/2003 | Ota et al. ...................... 525/242 |
| 2003/0207966 A1 | * | 11/2003 | Ohtsuka et al. ................ 524/88 |
| 2004/0161567 A1 | * | 8/2004 | Truog et al. ................. 428/40.1 |
| 2004/0191459 A1 | * | 9/2004 | Driesten ...................... 428/42.2 |
| 2006/0229411 A1 |   | 10/2006 | Hatfield et al. |
| 2006/0235122 A1 |   | 10/2006 | Paul et al. |
| 2006/0263595 A1 | * | 11/2006 | Scheubner ..................... 428/343 |
| 2007/0055014 A1 | * | 3/2007 | Lu et al. ......................... 525/64 |
| 2007/0160833 A1 | * | 7/2007 | Maak et al. .................. 428/343 |

FOREIGN PATENT DOCUMENTS

| EP | 0 150 218 | 8/1985 |
| WO | WO 99/13016 | 3/1999 |

OTHER PUBLICATIONS

Eastman data sheet for FORAL 85E (2008), available at http://www.eastman.com/Products/Pages/ProductHome.aspx?Product=71049749&list=Chemicals (accessed Nov. 14, 2012).*
FORAL 85 product datasheet from Pinova (Jul. 2011).*
FORAL 105 product datasheet from Pinova (Jul. 2011).*

* cited by examiner

*Primary Examiner* — Scott R. Walshon
(74) *Attorney, Agent, or Firm* — Hunton Andrews Kurth LLP

(57) ABSTRACT

The present invention relates to a hot-melt pressure-sensitive adhesive (HMPSA) composition. The composition includes: a) 25 to 50% of a styrene block copolymer chosen from the group comprising SIS, SIBS, SEBS and SEPS block copolymers; b) 35 to 75% of a compatible tackifying resin having a softening temperature of between 80 and 150° C. and an acid number of less than 20; and c) 0.5 to 20% of one or more carboxylic acids, the hydrocarbon chain of which includes 6 to 22 carbon atoms. The present invention also relates to a multilayer system including an HMPSA layer, a printable support layer, and an adjacent protective layer. Further, the present invention also includes a corresponding self-adhesive label and process for recycling a labeled article which entails debonding of the label by immersing the article in a hot basic aqueous solution.

26 Claims, No Drawings

HMPSA FOR REMOVABLE SELF-ADHESIVE LABEL

CROSS-REFERENCE TO RELATED APPLICATIONS

This application is the U.S. National Stage filing of International Application No. PCT/FR2008/000901, filed Jun. 26, 2008, which claims priority to French Application No. 0704678 filed Jun. 29, 2007, the disclosures of both of which are hereby incorporated in their entirety by reference.

The subject of the present invention is a hot-melt pressure-sensitive composition suitable for bonding self-adhesive labels that can be debonded during a process for recycling the articles to which they have been fastened (such as packages and/or containers, for example glass bottles). The invention also relates to a multilayer system comprising a layer consisting of said composition, to a self-adhesive label, to the corresponding labeled article and to a process for recycling said article, which includes a step of debonding the label.

BACKGROUND OF THE INVENTION

Many labeled packages and/or containers are subjected, after removal of their contents, to cleaning (or recycling) treatments either for the purpose of reusing them or, after destruction, for the purpose of recovering their constituent material. Such treatments often require the label to be completely separated from the article to which it is fastened, without leaving adhesive residues on the surface of said article, so as to make the recycling process easier.

These recycling processes, such as the one used for cleaning spent glass bottles, for example beer bottles, generally include a step of immersing the article to be cleaned in basic aqueous compositions maintained at temperatures between 60 and 100° C. The purpose of such a step is to debond the label fastened to the article and to separate it therefrom.

Pressure-sensitive adhesives or PSAs are substances giving the support coated therewith a tack at room temperature, which allows its instantaneous adhesion to a substrate under the effect of brief slight pressure. PSAs are widely used for the manufacture of self-adhesive labels, which are fastened to articles for the purpose of presenting information (such as a barcode, description, price) and/or for decorative purposes.

PSAs are generally applied by continuous coating processes to the entire surface of a printable support layer of large dimensions, consisting of paper or a film of polymer material having one or more layers. The adhesive layer that covers the printable support layer (generally the side opposite the printable side) is itself covered with a protective layer (often called a "release liner"), consisting for example of a siliconized film. The multilayer system obtained is generally packaged by being wound up in the form of large reels up to 2 m in width and 1 m in diameter, which can be stored and transported.

This multilayer system can be subsequently converted into self-adhesive labels that can be applied by the end user by means of conversion processes that include the printing of desired decorative elements and/or information on the printable side of the support layer, followed by cutting to the desired shape and dimensions. The protective layer may be easily removed without modifying the adhesive layer that remains fastened to the printable support layer. After separation from its protective layer, the label is applied at a temperature close to the ambient temperature to the article to be coated, either manually or with the use of labellers on automated packaging lines.

PSAs, because of their high room-temperature tack, make it possible for the label to be rapidly bonded to the article to be coated (for example bottles), suitable for obtaining high industrial production rates.

U.S. Pat. No. 3,763,117 describes an acrylate-based PSA having good adhesive properties, which allows easy separation when hot using a basic aqueous solution.

U.S. Pat. No. 5,385,965 also describes a PSA making it possible, after coating on a paper support or film of a polymer material, to obtain a label that can be detached from the substrate through the action of a hot alkaline solution. This PSA takes the form of an aqueous emulsion of an acrylate-based copolymer or of a styrene-butadiene copolymer. The solids content of this emulsion does not exceed 70%, so that coating this PSA on the support layer is complicated by the need for an emulsion drying step. In addition, such adhesives have the drawback of passing partially into a solution or into suspension in the aqueous compositions used for recycling labeled bottles, thereby imposing on industrial installations constraints in the reprocessing of these compositions before discharge into the environment.

U.S. Pat. No. 4,680,333 teaches a hot-melt pressure-sensitive adhesive composition comprising a styrene/isoprene/styrene block copolymer, an aliphatic resin having a low softening temperature and a metal salt of a fatty acid. This composition makes it possible, after a paper support has been coated with it and this support has been bonded to a substrate, to debond the thus fastened support at any moment, dry and at room temperature, without any other treatment, thus giving the coated support a repositionable adhesive behavior.

Hot-melt adhesives or hot melts (HMs) are substances that are solid at room temperature and contain neither water nor solvent. They are applied in the melt state and solidify upon being cooled, thus forming a joint for fastening the substrates to be assembled. Certain hot melts are formulated so as to give the support coated therewith a relatively hard and tack-free character. Other hot melts provide the support with a relatively soft and high-tack character. PSAs are widely used for the manufacture of self-adhesive labels—the corresponding adhesives are denoted by hot-melt pressure-sensitive adhesives or HMPSAs.

The HMPSA composition described by the U.S. Pat. No. 4,680,333 does not allow the label coated therewith to bond permanently to a substrate, since said label may be debonded dry at any moment.

Patent application US 2004/0220308 describes a hot-melt adhesive composition comprising a styrene block copolymer, an acid functional diluent, such as a fatty acid, and an acid tackifying resin having an acid number of greater than 100.

DETAILED DESCRIPTION

The objective of the present invention is to provide an adhesive which allows a label to be permanently bonded to an article, such as a package and/or a container (for example glass bottles) and which also offers the possibility of the label being rapidly and completely debonded during a step of immersing the labeled article in a basic aqueous solution at high temperature, the adhesive essentially remaining fastened to the label after its separation.

It has now been discovered that this objective can be completely or partly achieved by means of the hot-melt pressure-sensitive adhesive composition forming the subject matter of the present invention.

The invention therefore relates to a hot-melt pressure-sensitive adhesive (HMPSA) composition comprising:

a) 25 to 50% of one or more styrene block copolymers chosen from the group comprising SIS, SIBS, SEBS and SEPS block copolymers optionally blended with an amount of an SBS styrene block copolymer of less than 50% on the basis of the total weight of the styrene block copolymers;

b) 35 to 75% of one or more compatible tackifying resins having a softening temperature of between 80 and 150° C. and an acid number of less than 20; and c) 0.5 to 20% of one or more carboxylic acids, the hydrocarbon chain of which comprises 6 to 22 carbon atoms.

Unless otherwise indicated, the percentages used in the present text for expressing quantities correspond to weight/weight percentages.

The composition according to the invention makes it possible to achieve, after an oriented polypropylene (OPP) support has been coated therewith, permanent adhesion of said support to a glass substrate, corresponding to an adhesiveness (measured by the 180° peel test on glass) of advantageously between 1 and 15 N/cm, preferably between 2 and 10 N/cm. The adhesion of the support to the glass substrate is maintained over time, including in the presence of high relative humidity. However, the OPP support thus fastened to the glass substrate easily and completely debonds during a step of immersion in a basic aqueous medium, without leaving any trace of adhesive on said substrate.

Unlike the known acrylate-based PSAs of the prior art, the composition according to the invention is an HMPSA, the solid form of which at room temperature enables it to be advantageously applied by coating in the melt state onto the printable support layer of the label, without it being necessary to employ a drying step. Prior to it being coated, the HMPSA according to the invention may be preserved, without any drawback, in the molten state in a tank (also called a melter) at a high temperature, ranging up to 160° C., for a time ranging from several hours to up to 1 or 2 days.

In addition, in the immersion step, the adhesive essentially remains fastened to the OPP support after the latter has been debonded from the glass substrate. Thus, the adhesive does not dissolve (or is not dispersed), or only in very low proportions, in the aqueous compositions used in a recycling treatment, thereby avoiding additional washing bath decontamination treatments.

The block copolymers that can be used in the HMPSA according to the invention have a weight average molecular weight $M_w$ generally of between 60 kDa and 400 kDa and consist of blocks of various polymerized monomers. They have a triblock configuration of general formula:

A-B-A  (I)

in which:

A represents a nonelastomeric styrene block (or polystyrene); and

B represents an elastomeric block which may be:

polyisoprene: the block copolymer then has the structure: polystyrene/polyisoprene/polystyrene, and the name: SIS;

polyisoprene-polybutadiene: the block copolymer then has the structure polystyrene/polyisoprene/polybutadiene/polystyrene, and the name: SIBS;

fully or partly hydrogenated polyisoprene: the block copolymer then has the structure: polystyrene/poly(ethylenepropylene)/polystyrene, and the name: SEPS;

polybutadiene: the block copolymer then has the structure: polystyrene/polybutadiene/polystyrene, and the name: SBS; and fully or partly hydrogenated polybutadiene: the block copolymer then has the structure: polystyrene/poly(ethylenebutylene)/polystyrene, and the name: SEES. Optionally, this SEBS copolymer may have been chemically modified by maleic anhydride.

These styrene triblock copolymers may be obtained using processes known per se and are commercially available. The processes for obtaining these commercial products also result in general in the formation of variable amounts of diblock compounds of formula A-B. Thus, within the meaning of the present text, the terms SIS, SEES, SEPS and SBS denote in fact blends of triblocks and diblocks. The amount of diblocks may vary without any drawback from 0 to 90% on the basis of the total weight of styrene copolymers. In addition to the linear structure of formula (I), the styrene triblock copolymers that can be used in the HMPSA according to the invention may also have a radial structure.

It is quite obvious that the styrene block copolymer or copolymers included in the HMPSA according to the invention that are chosen from the group comprising SIS, SIBS, SEBS and SEPS block copolymers may belong to only one or to several of these four families of copolymers.

The amount of styrene block may itself vary widely, such as for example from 15% to 50% (on the basis of the total weight of block copolymers).

As examples of commercial products, the following may be mentioned:

linear SIS: Vector® 4411 from ExxonMobil having a diblock content of 0% and a styrene content of 44%; Kraton® D1113 from Kraton (56% diblock and 16% styrene); and Kraton® D1165 (25% diblock and 30% styrene);

radial SIS: Kraton® D1124 (29% diblock and 30% styrene); and Vector® DPX 586 (80% diblock and 18% styrene) from ExxonMobil;

SIBS: Kraton® MD 6455 (35% diblock and 18% styrene);

SBS: Europrene® Sol T 166 (10% diblock and 30% styrene) from the company Polimeri Europa (Italy); Stereon® 840A from Firestone; and Kraton® D1120 (75% diblock and 30% styrene); and SEBS: Kraton® G1726 (70% diblock and 30% styrene); and Kraton® G1924 (30% diblock and 13% styrene), which is an SEBS grafted with 1% maleic anhydride.

According to a preferred variant of the HMPSA according to the invention, the styrene block copolymer content may range from 35 to 50% and even more preferably from 40 to 45%.

According to another likewise preferred variant, the styrene block copolymer or copolymers contained in the HMPSA according to the invention are chosen from the group comprising SIS, SEES and SEPS block copolymers, taken individually or in a blend. Even more preferably the HMPSA comprises one or more SIS block copolymers.

The tackifying resin or resins that can be used in the HMPSA according to the invention have weight-average molecular weights $M_w$ of generally between 200 and 5000 and are chosen in particular from:
  (i) natural or chemically modified colophony rosins, such as for example the rosin extracted from pine gum and wood rosin extracted from tree roots, and their hydrogenated, dimerized or polymerized derivatives or esterified by monoalcohols or polyols such as glycerol, pentaerythritol or neopentylglycol;
  (ii) resins obtained by the hydrogenation, polymerization or copolymerization (with an aromatic hydrocarbon) of mixtures of unsaturated aliphatic hydrocarbons having about 5, 9 or 10 carbon atoms derived from petroleum fractions;
  (iii) terpene resins generally resulting from the polymerization of terpene hydrocarbons, such as for example monoterpene (or pinene) in the presence of Friedel-Crafts catalysts, optionally modified by the action of phenols; and
  (iv) copolymers based on natural terpenes, for example styrene/terpene, α-methyl styrene/terpene and vinyltoluene/terpene.

Tackifying resins that have a softening temperature of between 80 and 150° C. and an acid number of zero or not exceeding 20 are selected for inclusion in the HMPSA according to the invention.

The softening temperature (or point) is determined in accordance with the standardized ASTM E 28 test, the principle of which is the following. A brass ring of about 2 cm diameter is filled with the resin to be tested in the molten state. After cooling to room temperature, the ring and the solid resin are placed horizontally in a thermostated glycerol bath, the temperature of which is varied by 5° C. per minute. A steel ball about 9.5 mm in diameter is centered on the solid resin disk. The softening temperature is, during the phase in which the temperature of the bath is raised by 5° C. per minute, the temperature at which the resin disk flows by an amount of 25.4 mm under the weight of the ball.

The acid number (or AN) represents the amount of free acid and is the number of milligrams of potassium hydroxide needed to neutralize the acidity of 1 gram of resin, determined potentiometrically. The acid number of the resins belonging to the families of resins (ii) and (iv) is zero.

The tackifying resins are commercially available, and among those having a softening temperature between 80 and 150° C. and an acid number of zero or less than 20 that may be mentioned in the above families are, for example, the following products:
  (i) Sylvalite® RE 100S from the company Arizona Chemical (an ester of colophony rosin and pentaerythritol having a softening temperature of about 100° C. and an AN of less than 10); Dertoline® G2L (softening temperature of 87° C. and AN of 20); and Dertopoline® CG (softening temperature of 117° C. and AN of 7) from the French company DRT; and
  (ii) Escorez® 5600 available from ExxonMobil Chemical, which is a hydrogenated dicyclopentadiene resin modified by an aromatic compound (having an $M_w$ of about 980 Da and a softening temperature of 100° C.); Escorez® 5615, of similar structure (softening temperature of 115° C.) and Escorez® 5400 (softening temperature of 100° C.) also from Exxon Chemicals; Wingtack® 86 from Cray Valley; and Regalite® R5100 from Eastman;
  (iii) Dertophene® T from DRT (having a softening temperature of 95° C. and an acid number of less than 1); and Sylvarez® TP95 from Arizona Chemical, which is a phenolic terpene resin with a softening temperature of 95° C. and an $M_w$ of about 1120 Da; and
  (iv) Sylvarez® ZT105LT from Arizona Chemical, which is a styrene/terpene copolymer with a softening point of 105° C.

The term "compatible tackifying resin" is understood to mean a tackifying resin which, when it is mixed in 50%/50% proportions with a block copolymer chosen from the group comprising SIS, SIBS, SEBS and SEPS block copolymers, gives a substantially homogeneous blend.

Tackifying resins having a softening temperature of between 95 and 120° C. and an acid number of less than 10 are preferred, such as Escorez® 5600 or 5615, Sylvarez® ZT 105 LT or Sylvalite® RE 100S.

According to another preferred variant of the invention, the acid number of the tackifying resins is approximately zero.

The tackifying resin content of the HMPSA according to the invention is advantageously between 40 and 55%.

The carboxylic acids in the composition according to the invention have a hydrocarbon chain comprising 6 to 22 carbon atoms. These carboxylic acids may be chosen from:
  (α) saturated or unsaturated, monocarboxylic fatty acids, whether pure or as mixtures;
  (β) mixtures of saturated or unsaturated, polycarboxylic fatty acids of the dimer or trimer type; and
  (γ) mixtures of saturated or unsaturated, polycyclic monocarboxylic acids.

The monocarboxylic fatty acids (α) generally have a linear or, optionally, branched chain for the hydrocarbon radical. When pure acids are used, hydrocarbon radicals comprising between 10 and 20 carbon atoms are preferred.

The use of mixtures of monocarboxylic fatty acids (α) is advantageous since these mixtures derive from animal or vegetable fats and are called "fractions". These fractions are rich in hydrocarbon radicals comprising 6 to 22 carbon atoms. Nonlimiting examples of such reactions that may be mentioned include:
  oleic fatty acids, such as RADIACID® 208 available from the company Oleon;
  sunflower fatty acids, copra fatty acids (RADIACID® 600), rapeseed fatty acids (RADIACID® 166), soya fatty acids (RADIACID® 110 and RADIACID® 121), palm fatty acids and palm kernel fatty acids or tall oil derivatives;
  tallow fatty acids, such as RADIACID® 401 and RADIACID® 403; and
  hydrogenated tallow fatty acids, such as RADIACID® 408 and RADIACID® 409.

The mixtures (β) of polycarboxylic fatty acids are obtained by dimerization of unsaturated monocarboxylic fatty acid fractions comprising predominantly hydrocarbon radicals containing 16 to 18 carbon atoms. The corresponding products are essentially dimers (such as RADIACID® 951 and RADIACID® 970) or a mixture of dimers and trimers (such as RADIACID® 980).

The mixtures of polycyclic monocarboxylic acids (γ) preferably come from cuts of plant origin rich in compounds having 18 to 22 carbon atoms and 3 fused rings each having 6 carbon atoms. Examples of such compounds are abietic, levopimaric, neoabietic, dehydroabeitic, palustric and pimaric acids. Usually, the mixtures (γ) are commercially available in the form of:
  gum rosin extracted from pine resin; or
  tall oil rosin extracted from black liquors that are byproducts of the papermaking industry.

As examples of such products, the following may be mentioned: FORAL® AX from Hercules, which is a hydrogenated tall oil rosin; Staybelite® E from Eastman, which is a partially hydrogenated gum rosin; and Sylvatal® 20/25 from Arizona Chemical, which is a tall oil rosin.

The products (α), (β) and (γ) have an acid number (AN) (as defined above) of between 130 and 280 mg KOH/g and an iodine number (IN) of between 0 and 140. The iodine number represents the number of double bonds in the hydrocarbon radicals and corresponds to the number of grams of iodine attached per 100 grams of fatty acid.

Thus RADIACID® 208 has an AN of between 184 and 196 and an IN of between 75 and 94. RADIACID® 970 has an AN of between 188 and 198 and an IN of less than 94. RADIACID® 980 has an AN of 180 and an IN of less than 94. RADIACID® 403 has an AN of between 192 and 198 and an IN of 42 to 51. RADIACID® 600 has an AN of 250 to 264 and an IN of 6 to 9. FORAL® AX has an AN of between 130 and 160 and an IN of about 0. Staybelite® E has an AN of about 162. Sylvatal® 20/25 has an AN of 188 and an IN of about 0.

The carboxylic acid content of the HMPSA according to the invention is preferably between 3 and 15%.

The carboxylic acids of type (α) and (β) provide particularly advantageous results, the products of type (β) being more preferred because of improved tack for the HMPSA.

A 0.1 to 2% amount of one or more stabilizers (or antioxidants) is furthermore preferably included in the composition according to the invention. These compounds are introduced so as to protect the composition from degradation resulting from a reaction with oxygen, which is liable to form through the action of heat, light or residual catalysts on certain raw materials, such as tackifying resins. These compounds may include primary antioxidants, which trap the free radicals and are generally substituted phenols, such as Irganox® 1010 from Ciba-Geigy. The primary antioxidants may be used by themselves or in combination with other antioxidants, such as phosphites like Irgafos® 168, also from Ciba-Geigy, or else with UV stabilizers, such as amines.

The composition according to the invention may also include up to 20% of a plasticizer. This plasticizer may be a paraffinic or naphthenic oil which may contain a fraction of aromatic compounds (such as Primol® 352 from Esso) or not contain such a fraction (such as Nyflex 222B from Nynas).

The composition according to the invention may also include a wax of a polyethylene homopolymer (such as A-C® 617 from Honeywell) or else a wax of a polyethylene/vinyl acetate copolymer, or pigments, dyes or fillers.

The hot-melt self-adhesive composition according to the invention is prepared by simply mixing its components at a temperature of between 130 and 200° C. until a homogeneous compound is obtained. The required mixing conditions are well known to those skilled in the art.

The subject of the present invention is also a multilayer system comprising:
  an adhesive layer consisting of the hot-melt pressure-sensitive composition according to the invention;
  a printable support layer adjacent said adhesive layer, consisting of paper or polymer film having one or more layers; and
  a protective layer adjacent said adhesive layer.

It is preferred to use, as printable support layer, an OPP/PET bilayer film, the OPP layer of which is adjacent the adhesive layer.

The HMPSA according to the invention is applied in the melt state at a temperature of greater than 130° C. to the printable support layer in an amount generally of between 15 and 30 g/m² so as to form the adhesive layer. The application is carried out by known coating techniques such as, for example, lipped-nozzle coating (at a temperature of about 160 to 180° C.) or curtain coating (at a temperature of about 120 to 180° C.). The HMPSA is generally applied by a lipped nozzle onto the protective layer, the assembly then being laminated to the support layer (transfer coating). The application of the HMPSA by curtain coating may be carried out directly on the support layer, depending on the coating temperature.

The multilayer system obtained is in the form of a rectangle of very great length and is generally packaged by being wound up in the form of a large reel up to 2 m in width and 1 m in diameter.

The invention also relates to a self-adhesive label that can be obtained by conversion of the multilayer system described above. The conversion process employed generally includes:
  a printing step, for printing on the printable support layer; then
  a cutting step, for cutting the multilayer system so as to reduce the width thereof and therefore to repackage it on a reel of smaller width; and then
  a step (termed "clearing up") for obtaining a multilayer system packaged on the reel of the preceding step, in which the unchanged protective layer is bonded to only that part of the printed support layer that corresponds to the shape and to the dimensions of the self-adhesive label suitable for its final use. This step therefore consists in selective cutting followed by removal of the undesirable part of the support layer and of the adhesive layer, said part often being called the "skeleton of the label".

This latter multilayer system is employed on lines for the packaging of articles to be labeled by means of automated systems that separate the self-adhesive labels from the protective layer and fix them to the articles to be labeled.

The subject of the invention is also an article coated with the self-adhesive label as defined above.

The labeled article is preferably a package or container made of glass or of a usual plastic material chosen from PET (polyethylene terephthalate), PVC (polyvinyl chloride), PE (polyethylene) and PP (polypropylene). A glass bottle is more particularly preferred. The glass bottles in question may or may not have received during their manufacture a coating treatment intended for maintaining their mechanical properties over time and for protecting them from being scratched. Such a treatment leads, for example, to the deposition of a metal oxide layer onto the surface of the glass, said metal oxide layer optionally being covered with an additional layer of waxy nature.

Finally, the invention relates to a process for recycling a labeled article, which includes a step of debonding the label by immersion of the labeled article in a basic aqueous solution maintained at a temperature of between 60 and 100° C., characterized in that the labeled article is as defined above.

Advantageously, the debonding of the label by this process results in its complete separation from the article, without leaving any adhesive residue on the surface of said article and without the adhesive composition contaminating the basic aqueous washing solution. Within the context of industrial implementation of the process, there is as a result less pollution of the washing water and the recycling process is more economic, in particular from the standpoint of the quantity of water consumed. The labels thus separated from the treated articles may be collected and removed from the washing bath by appropriate mechanical means.

The process according to the invention is preferably implemented at a temperature of about 80° C.

The adhesiveness of the HMPSA according to the invention is determined by the 180° C. peel test on a glass plate, as described in FINAT Test Method No. 1 published in the FINAT Technical Manual, 6th edition, 2001. FINAT is the International Federation for Self-adhesive Label Manufacturers and Converters. The principle of this test is as follows. The OPP side of a support layer, consisting of a 19 μm thick PET film laminated to a 50 μm thick OPP film by means of a bicomponent polyurethane adhesive, is coated beforehand with the HMPSA in an amount of 20 g/m². A specimen in the form of a rectangular strip (measuring 25 mm×175 mm) is cut from the self-adhesive support thus obtained. This specimen is fastened to a substrate consisting of a glass plate. The assembly obtained is left for 20 minutes at room temperature and is then introduced into a tensile testing machine capable of peeling or debonding the strip at an angle of 180° and with a separation rate of 300 mm per minute. The machine measures the force required to debond the strip under these conditions. The result is expressed in N/cm. The 180° C. peel strength, when bonded to a glass plate, of the adhesives intended for manufacturing self-adhesive labels is generally greater than 2 N/cm, preferably greater than 4 N/cm.

The tack of the HMPSA according to the invention is determined by the loop tack test described in FINAT Test Method No. 9. A 50 μm thick OPP film is coated beforehand with the HMPSA in an amount of 20 g/m² so as to obtain a rectangular strip measuring 25 mm by 175 mm. The two ends of this strip are joined together to form a loop, the adhesive layer of which is facing outward. The two joined ends are placed in the movable jaw of a tensile testing machine capable of imposing a rate of displacement of 300 mm/minute along a vertical axis, with the possibility of forming a forward-and-back movement. The lower part of the loop placed in the vertical position is firstly put into contact with a horizontal glass plate measuring 25 mm by 30 mm over a square area measuring about 25 mm per side. Once this contact has occurred, the displacement direction of the jaw is reversed. The tack is the maximum value of the force needed for the loop to be completely debonded from the plate. The tack of a PSA is generally equal to or greater than 1 N/cm².

The hot debondability in basic aqueous medium of labels coated with the HMPSA according to the invention, fastened beforehand to a glass substrate, is determined by the following test.

Glass bottles 5 cm in diameter and about 20 cm in height are used, these being divided into two groups depending on the nature of the constituent glass. This is because glass has two types of surface layer, depending on the coating treatment applied during manufacture of the bottles. The 1st type of layer essentially comprises tin oxide. The 2nd type essentially comprises an oxidized polyethylene wax emulsion applied to a tin oxide layer. The 2nd type of layer is characteristic of new glass bottles. The 1st type is characteristic of glass bottles that have already been immersed in a basic aqueous solution, during at least one cleaning cycle. The 1st group of bottles is denoted hereafter by "SnO" and the 2nd by the abbreviation "PE".

The same support layer is coated with the HMPSA to be tested, the coating conditions being the same as in the 180° peel test. A rectangular (7 cm×5 cm) label is cut from the self-adhesive support thus obtained and fastened to a glass bottle by simple pressure, the assembly being left for 24 hours at room temperature.

Next, the labeled glass bottle is immersed in a pH 12 water bath thermostatted to 80° C.

After the bottle has been immersed for 60 seconds, the percentage debonding of the label (hereafter called "percent debond") is visually determined for "SnO" type and "PE" type bottles.

The amount of adhesive present in the basic aqueous solution after immersion of the labeled bottle and separation of the label is measured in the following manner. During the implementation of the previous test, the weight P1 of the self-adhesive label before it is fastened to the glass bottle is determined. After the bottle and the label have been immersed for 20 minutes in the basic aqueous solution, the label, which is then debonded from the bottle, is recovered, and dried to constant weight P2. The weight difference P1-P2, expressed as a percentage relative to P1, corresponds to the loss of HMPSA of the self-adhesive label.

The following examples are given purely to illustrate the invention, but should not be interpreted as limiting its scope.

The compositions given in Table 1 below were prepared by simple hot mixing of the ingredients at 180° C. Apart from these ingredients, said compositions also contained 0.5% Irganox® 1010 and 0.5% Irgafos® 168. The contents of the other ingredients are indicated in Table 1.

The results of the tests carried out are indicated in Table 2.

For all these examples, during implementation of the hot debonding test in basic aqueous medium, no trace of adhesive on the surface of the bottles was observed after separation of the label. The loss of HMPSA of the label was 0%, indicating that, for all these examples, the basic aqueous washing solution contained no HMPSA.

TABLE 1

| Ingredient | Content in % | | | | | | | | | | |
| --- | --- | --- | --- | --- | --- | --- | --- | --- | --- | --- | --- |
| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
| Kraton ® D1124 | 40 | 40 | — | 31 | 25 | 40 | 40 | 40 | — | — | — |
| Kraton ® D1165 | — | — | — | — | — | — | — | — | — | 40 | 40 |
| Vector ® 4411 | — | — | 30 | — | — | — | — | — | — | — | — |
| Vector ® DPX 586 | — | — | 15 | — | — | — | — | — | 44 | — | — |
| Kraton ® G1726 | — | — | — | 12 | — | — | — | — | — | — | — |
| Europrene ® Sol T 166 | — | — | — | — | 15 | — | — | — | — | — | — |
| Sylvarez ® ZT 105 LT | 22 | 24 | 21 | 24 | 23 | 20 | 22 | 18 | 21 | 22 | — |
| Escorez ® 5600 | 20 | 23 | 23 | 21 | 24 | — | — | — | — | — | — |
| Escorez ® 5400 | — | — | — | — | — | — | — | — | — | — | 22 |
| Escorez ® 5615 | — | — | — | — | — | 20 | 20 | 19 | 20 | 20 | 20 |
| Sylvalite ® RE 100S | 5 | — | — | — | — | 5 | — | — | 4 | 5 | 5 |

TABLE 1-continued

| Ingredient | Content in % | | | | | | | | | | |
|---|---|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
| Radiacid ® 970 | 4 | — | 10 | — | 4 | — | — | 4 | — | — | — |
| Radiacid ® 980 | — | 4 | — | — | — | — | — | — | — | — | — |
| Radiacid ® 600 | — | — | — | — | — | 6 | 4 | — | — | — | — |
| Radiacid ® 208 | — | — | — | 3 | — | — | — | — | — | — | — |
| Sylvatal ® 20/25 | — | — | — | — | — | — | — | — | 4 | 4 | 4 |
| Foral ® AX | — | — | — | — | — | — | 5 | 10 | — | — | — |
| Primol ® 352 | 8 | 8 | — | 3 | 8 | 8 | 8 | 8 | 6 | 8 | 8 |
| A-C ® 617 | — | — | — | 5 | — | — | — | — | — | — | — |

TABLE 2

| Tests | Results | | | | | | | | | | |
|---|---|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
| 180° peel on glass (N/cm) | 6 | 8 | 3 | 5 | 2 | 2 | 2 | 3 | 4 | 5 | 2 |
| Loop tack (N/cm$^2$) | 5 | 1 | 4 | 2 | 4 | 1 | 1 | 3 | 4 | 3 | 2 |
| PE % debond | 100 | 90 | 90 | 80 | 100 | 80 | 90 | 80 | 80 | 100 | 100 |
| SnO % debond | 100 | 100 | 80 | 100 | 100 | 100 | 100 | 100 | 100 | 100 | 100 |

The invention claimed is:

1. A hot-melt pressure-sensitive adhesive composition comprising:
   (a) 25 to 50% by weight of one or more styrene block copolymers, the styrene block copolymers selected from the group consisting of: polystyrene-polyisoprene-polystyrene (SIS), polystyrene-polyisoprene-polybutadiene-polystyrene (SIBS), polystyrene-poly(ethylenebutylene)-polystyrene (SEBS), and polystyrene-poly(ethylenepropylene)-polystyrene (SEPS) block copolymer; wherein the amount of styrene block is from 15% to 50% of the total weight of the block copolymers, and
   (b) 35 to 75% by weight of one or more compatible tackifying resins having a softening temperature of between 80 and 150° C. and an acid number of less than 20; and
   (c) 0.5 to 20% by weight of one or more carboxylic acids, the hydrocarbon chain of which comprises 6 to 54 carbon atoms;
   wherein, when used to bond a self-adhesive label to an article, the composition debonds when immersed in a basic aqueous solution but remains essentially fastened to the label without contaminating the basic aqueous solution.

2. The composition of claim 1, wherein 35% to 50% by weight of the composition is one or more styrene block copolymers.

3. The composition of claim 1, wherein styrene block copolymers comprise polystyrene-polyisoprene-polystyrene (SIS), polystyrene-poly(ethylenebutylene)-polystyrene (SEBS), or polystyrene-poly(ethylenepropylene)-polystyrene (SEPS).

4. The composition of claim 1, wherein the styrene block copolymers comprise polystyrene-polyisoprene-polystyrene (SIS).

5. The composition of claim 1, wherein the tackifying resins are chosen from:
   (a) natural or chemically modified colophony rosins and their hydrogenated, dehydrogenated, dimerized or polymerized derivatives or esters with monoalcohols or polyols;
   (b) hydrogenated, polymerized or copolymerized resins from mixtures of petroleum fraction derived unsaturated aliphatic hydrocarbons, wherein the unsaturated aliphatic hydrocarbons have about 5 to 10 carbon atoms;
   (c) terpene resins, optionally modified by the action of phenols; or
   (d) copolymers based on natural terpenes.

6. The composition of claim 5, comprising a tackifying resin that is a hydrogenated, polymerized or copolymerized resin selected from a mixture of petroleum fraction derived unsaturated aliphatic hydrocarbons, wherein the mixture comprises unsaturated aliphatic hydrocarbons having 5, 9, or 10 carbon atoms.

7. The composition of claim 1, comprising a tackifying resin having a softening temperature of between 95 and 120° C. and an acid number of less than 10.

8. The composition of claim 1, comprising a tackifying resin having an acid number of about zero.

9. The composition of claim 1, wherein 40% to 55% by weight of the composition is one or more compatible tackifying resins.

10. The composition of claim 1, wherein 3% to 15% by weight of the composition is one or more carboxylic acids.

11. The composition of claim 1, further comprising 0.1 to 2% by weight one or more stabilizers and up to 20% by weight plasticizer.

12. The composition of claim 1 wherein 40% to 45% by weight of the composition is one or more styrene block copolymers.

13. The composition of claim 1, comprising a carboxylic acid that is a saturated or unsaturated, monocarboxylic fatty acid.

14. The composition of claim 1, wherein the composition does not contain water.

15. The composition of claim 1, further comprising a polystyrene-polybutadiene-polystyrene (SBS) styrene block copolymer in an amount of less than 50% by weight of the total weight of the one or more styrene block copolymers.

16. A multilayer system comprising:
(a) an adhesive layer comprising the composition of claim 1;
(b) a printable support layer adjacent to the adhesive layer comprising a paper or polymer film having one or more layers; and
(c) a protective layer adjacent to the adhesive layer.

17. The system of claim 16, wherein the printable support layer is an oriented polypropylene/polyethylene terephthalate (OPP/PET) bilayer film, the oriented polypropylene layer being adjacent to the adhesive layer.

18. A self-adhesive label comprising the system of claim 16.

19. An article labeled with the label of claim 18.

20. The article of claim 19, wherein the article is a package or container made of glass or plastic.

21. The article of claim 19, wherein the article is a glass bottle.

22. A process for recycling the labeled article of claim 19, comprising the step of debonding the label bonded thereon by immersing the article in a basic aqueous solution maintained at a temperature of between 60 and 100° C.

23. A hot-melt pressure-sensitive adhesive composition comprising:
(a) 25 to 50% by weight of one or more styrene block copolymers, the styrene block copolymers selected from the group consisting of: polystyrene-polyisoprene-polystyrene (SIS), polystyrene-polyisoprene-polybutadiene-polystyrene (SIBS), polystyrene-poly(ethylenebutylene)-polystyrene (SEBS), and polystyrene-poly(ethylenepropylene)-polystyrene (SEPS) block copolymers;
wherein the amount of styrene block is from 15% to 50% of the total weight of the block copolymers, and
(b) 35 to 75% by weight of one or more compatible tackifying resins having a softening temperature of between 80 and 150° C. and an acid number of less than 20; and
(c) 0.5 to 20% by weight of one or more saturated or unsaturated, dimer or trimer type polycarboxylic fatty acids;
wherein, when used to bond a self-adhesive label to an article, the composition debonds when immersed in a basic aqueous solution but remains essentially fastened to the label without contaminating the basic aqueous solution.

24. The composition of claim 23, further comprising a polystyrene-polybutadiene-polystyrene (SBS) styrene block copolymer in an amount of less than 50% by weight of the total weight of the one or more styrene block copolymers.

25. A hot-melt pressure-sensitive adhesive composition comprising:
(a) 25 to 50% by weight of one or more styrene block copolymers, the styrene block copolymers selected from the group consisting of: polystyrene-polyisoprene-polystyrene (SIS), polystyrene-polyisoprene-polybutadiene-polystyrene (SIBS), polystyrene-poly(ethylenebutylene)-polystyrene (SEBS), and polystyrene-poly(ethylenepropylene)-polystyrene (SEPS) block copolymers;
wherein the amount of styrene block is from 15% to 50% of the total weight of the block copolymers, and
(b) 35 to 75% by weight of one or more compatible tackifying resins having a softening temperature of between 80 and 150° C. and an acid number of less than 20; and
(c) 0.5 to 20% by weight of a mixture of saturated or unsaturated, polycyclic monocarboxylic acids;
wherein, when used to bond a self-adhesive label to an article, the composition debonds when immersed in a basic aqueous solution but remains essentially fastened to the label without contaminating the basic aqueous solution.

26. The composition of claim 25, further comprising a polystyrene-polybutadiene-polystyrene (SBS) styrene block copolymer in an amount of less than 50% by weight of the total weight of the one or more styrene block copolymers.

* * * * *